United States Patent
Österling

(10) Patent No.: US 9,825,720 B2
(45) Date of Patent: Nov. 21, 2017

(54) METHOD AND APPARATUS FOR SELECTIVELY RECEIVING RADIO SIGNALS

(71) Applicant: Telefonaktiebolaget LM Ericsson (publ), Stockholm (SE)

(72) Inventor: Jacob Österling, Järfälla (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/108,560

(22) PCT Filed: Dec. 27, 2013

(86) PCT No.: PCT/SE2013/051623
§ 371 (c)(1),
(2) Date: Jun. 27, 2016

(87) PCT Pub. No.: WO2015/099586
PCT Pub. Date: Jul. 2, 2015

(65) Prior Publication Data
US 2016/0337057 A1  Nov. 17, 2016

(51) Int. Cl.
*H04B 17/00* (2015.01)
*H04B 17/318* (2015.01)
*H04B 1/10* (2006.01)
*H04W 52/24* (2009.01)

(52) U.S. Cl.
CPC .......... *H04B 17/318* (2015.01); *H04B 1/109* (2013.01); *H04W 52/244* (2013.01)

(58) Field of Classification Search
CPC ...... H04B 7/024; H04B 7/0845; H04B 1/109; H04B 17/318; H04W 88/085; H04W 52/244
See application file for complete search history.

(56) References Cited

U.S. PATENT DOCUMENTS

| | | | |
|---|---|---|---|
| 2008/0232305 A1* | 9/2008 | Oren | H04B 7/022 370/328 |
| 2010/0290413 A1 | 11/2010 | Kuwahara | |
| 2012/0134279 A1* | 5/2012 | Tamaki | H04B 7/024 370/248 |
| 2012/0257516 A1* | 10/2012 | Pazhyannur | H04B 7/024 370/252 |
| 2012/0294162 A1* | 11/2012 | Pajukoski | H04B 7/024 370/252 |
| 2015/0163747 A1* | 6/2015 | Chen | H04B 1/109 455/78 |

OTHER PUBLICATIONS

International Search Report and Written Opinion, Application No. PCT/SE2013/051623, dated Apr. 28, 2014, 9 pages.
International Preliminary Report on Patentability, Application No. PCT/SE2013/051623, dated Jul. 7, 2016, 7 pages.

* cited by examiner

*Primary Examiner* — Ping Hsieh
(74) *Attorney, Agent, or Firm* — NDWE LLP

(57) ABSTRACT

A method, performed in a network node, for selectively receiving radio signals received in a plurality of remote radio head devices connected to the network node. The method comprises determining that a power level of a received radio signal for a first remote radio head device exceeds a threshold power and blocking received radio signals from the first remote radio head device when the power level exceeds the threshold power. A corresponding network node, remote radio head device, computer program and computer program product are also presented.

21 Claims, 5 Drawing Sheets

METHOD AND APPARATUS FOR SELECTIVELY RECEIVING RADIO SIGNALS

CROSS-REFERENCE TO RELATED APPLICATIONS

This application is a National stage of International Application No. PCT/SE2013/051623, filed Dec. 27, 2013, which is hereby incorporated by reference.

TECHNICAL FIELD

The invention relates to methods, network node, remote radio head device computer programs and computer program products for selectively receiving radio signals, particularly when a plurality of remote radio head devices are used in a single cell.

BACKGROUND

When deploying wireless communication networks, there is a balance between coverage and capacity. On the one hand, a few large cells can provide great coverage but at a cost of reduced capacity. On the other hand, a scenario with many small cells creates better capacity and throughput, but may not provide the desired coverage. Hence, there is often a combination of larger cells to provide sufficient coverage with smaller cells to provide better capacity.

However, when the cells get too small, wireless terminals moving in the network cause a great number of handovers which causes significant overhead. Moreover, providing coverage indoors using many small cells can be quite costly, with a radio base station for each such small cell.

One solution to this problem is to use remote radio head devices, where several remote radio head devices connected to the same radio base station share the same cell. In this way, a single radio base station can provide coverage in different parts of the building by placing the remote radio head devices appropriately. Moreover, the wireless device can move between the coverage of different remote radio head devices while staying within the same cell, thus avoiding causing handovers.

However, there may be interferers in close proximity of a remote radio head device. Such an interferer can completely block out a wanted uplink signal or saturate amplifiers or similar in the remote radio head device in question.

SUMMARY

It is an object to improve the way in which interferers are handled when remote radio head devices are used.

According to a first aspect, it is presented a method, performed in a network node, for selectively receiving radio signals received in a plurality of remote radio head devices connected to the network node. The method comprises the steps of: determining that a power level of a received radio signal for a first remote radio head device exceeds a threshold power; and blocking received radio signals from the first remote radio head device when the power level exceeds the threshold power. By blocking the received signals from the remote radio head with excessive power, its signal does not drown the other signals. Still, in many cases, other remote radio heads can pick up desired uplink signals with minimal or no impact on user experience.

The step of determining may comprise detecting the power level using an envelope detector.

The step of blocking may comprise sending a command to the first remote radio head device to block its received radio signal output.

The step of blocking may comprise blocking, within the network node, the received radio signal from the first remote radio head device.

The method may further comprise a step of combining received radio signals from all remote radio head devices except the first remote radio head device.

The step of combining may comprise combining the radio signals at intermediate frequency.

The method may be performed in parallel for each one of the remote radio head devices.

According to a second aspect, it is presented a network node for selectively receiving radio signals from a plurality of remote radio head devices connected to the network node. The network node comprises: a power level detector arranged to determine that a power level of a received radio signal for a first remote radio head device exceeds a threshold power; and a blocking device arranged to block received radio signals from the first remote radio head device when the power level exceeds the threshold power.

The power level detector may comprise an envelope detector.

The blocking device may be a switch.

The network node may further comprise a combiner for combining received radio signals from all remote radio head devices except the first remote radio head device when the received radio signals from the first remote radio head device are blocked.

The combiner may comprise an intermediate frequency combiner.

The network node may comprise a respective power level detector and blocking device for each connected remote radio head.

According to a third aspect, it is presented a computer program for selectively receiving radio signals received in a plurality of remote radio head devices connected to a network node, the computer program comprising computer program code which, when run on the network node causes the network node to: determine that a power level of a received radio signal for a first remote radio head device exceeds a threshold power; and combine radio signals from all the remote radio head devices, except the first remote radio head device, yielding a combined received radio signal.

According to a fourth aspect, it is presented a computer program product comprising a computer program according to the third aspect and a computer readable means on which the computer program is stored.

According to a fifth aspect, it is presented a network node comprising means for determining that a power level of a received radio signal for a first remote radio head device exceeds a threshold power, when the first remote radio head device is one of a plurality of remote radio head devices connected to the network node; and means for blocking received radio signals from the first remote radio head device when the power level exceeds the threshold power The means for determining may comprise means for detecting the power level using an envelope detector.

The means for blocking may comprise means for sending a command to the first remote radio head device to block its received radio signal output.

The means for blocking may comprise means for blocking, within the network node, the received radio signal from the first remote radio head device.

The network node may further comprise means for combining received radio signals from all remote radio head devices except the first remote radio head device.

The means for combining may comprise means for combining the radio signals at intermediate frequency.

The network node may comprise means for handling each one of the remote radio head devices in parallel.

According to a sixth aspect, it is presented a method for selectively receiving radio signals from one or more wireless devices. The method is performed in a remote radio head device connected to a network node and comprises the steps of: measuring a power level of a received radio signal, yielding a power measurement; and blocking received radio signals in dependence of the power level to thereby prevent received radio signals from reaching the network node.

The method may further comprise the step of determining that the power level exceeds a threshold power; in which case the step of blocking comprises only blocking the received radio signals when the power level exceeds the threshold power.

The method may further comprise the steps of: transmitting the power measurement to the network node; and receiving a blocking signal from the network node.

According to a seventh aspect, it is presented a remote radio head device for selectively receiving radio signals from one or more wireless devices, the remote radio head device being connected to a network node. The remote radio head device comprises: a power detector arranged to measure a power level of a received radio signal, yielding a power measurement; and a blocking device arranged to block received radio signals to thereby prevent received radio signals from reaching the network node.

The blocking device may be arranged to only block received signals when the power level exceeds a threshold power.

The remote radio head device may further comprise: a transmitter arranged to transmit the power measurement to the network node; and a controller arranged to receive a blocking signal from the network node.

According to a eighth aspect, it is presented a computer program for selectively receiving radio signals from one or more wireless devices in a remote radio head device being connected to a network node. The computer program comprises computer program code which, when run on the remote radio head device causes the remote radio head device to: measure a power level of a received radio signal, yielding a power measurement; transmit the power measurement to the network node; receive a blocking signal from the network node; and block received radio signals to thereby prevent received radio signals from reaching the network node.

According to a ninth aspect, it is presented a computer program product comprising a computer program according to the eighth and a computer readable means on which the computer program is stored.

According to a tenth aspect, it is presented a remote radio head device comprising means for measuring, when connected to a network node, a power level of a received radio signal, yielding a power measurement; and means for blocking received radio signals in dependence of the power level to thereby prevent received radio signals from reaching the network node.

The remote radio head device may further comprise means for determining that the power level exceeds a threshold power; in which case the means for blocking comprises means for only blocking the received radio signals when the power level exceeds the threshold power.

The remote radio head device may further comprise means for transmitting the power measurement to the network node; and means for receiving a blocking signal from the network node.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
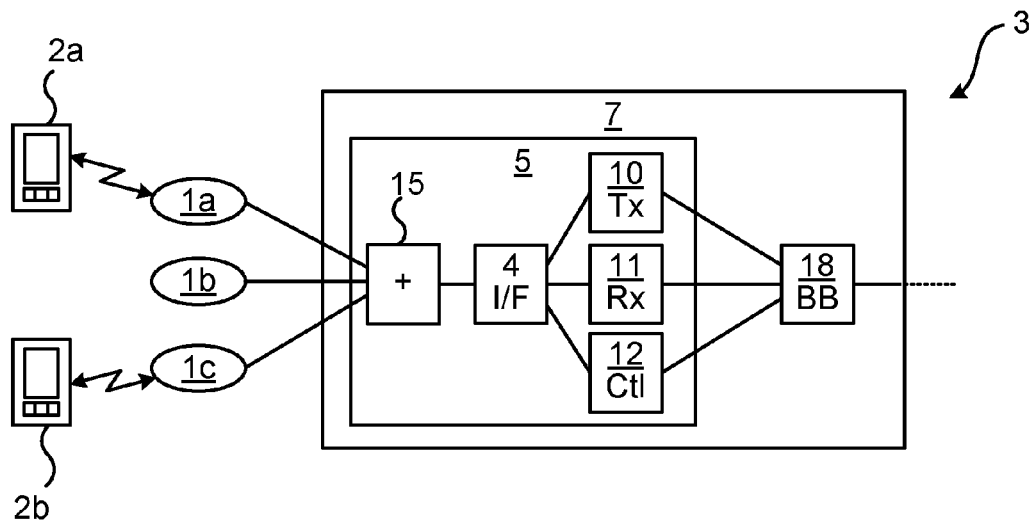
FIGS. 1A-C are schematic diagrams illustrating environments where embodiments presented herein can be applied.
Figure 1B:
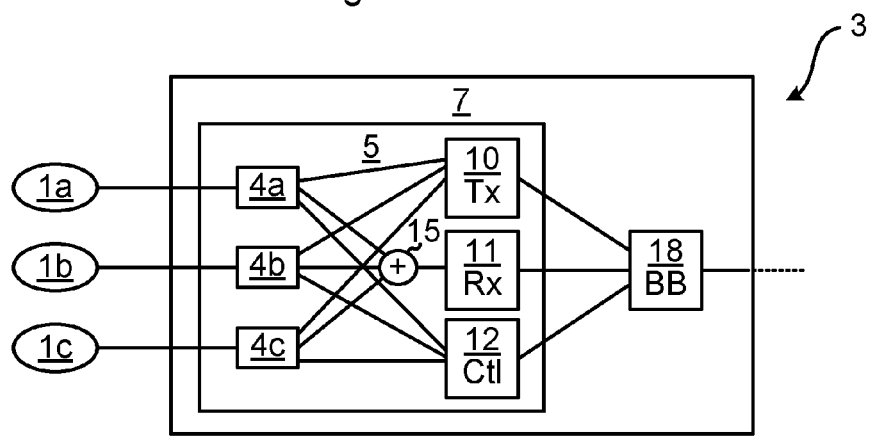
Figure 1C:
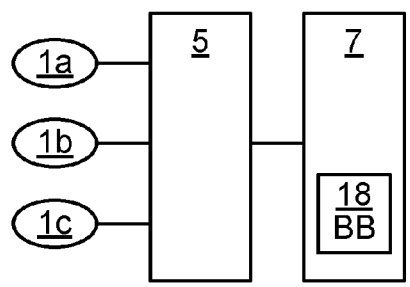

FIGS. 1A-C are schematic diagrams illustrating a wireless communication networks 3 being environments where embodiments presented herein can be applied. Considering first FIG. 1A, the wireless communication network 3 comprises a number of remote radio head devices 1a-c for installation in locations where traditional deployment with antennas being co-located with the radio base stations is not ideal. For example, the wireless communication network 3 can be installed indoors, such as in an office, shopping centre, train station or airport.

It is to be noted that, while the embodiments presented herein are described as implemented using LTE (Long Term Evolution), any applicable communication standard may be used, such as any one or a combination of LTE-SAE (Long Term Evolution-System Architecture Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

A radio base station 7 here comprises a baseband module 18 and an intermediate radio unit (IRU) 5. The IRU 5 is in turn connected to a number (in this example three) remote radio head devices 1a-c via respective cables. The remote radio head devices 1a-c connected to the IRU 5 are part of a single cell and thus share a cell identifier. Antennas do not need to be included in this embodiment of the radio base station 7 or the IRU 5, as the remote radio head devices 1a-c provide the wireless link to one or more wireless devices 2a-b. The wireless link provided by the remote radio head devices 1a-c includes both downlink (DL) communication to the wireless devices 2a-b and uplink (UL) communication from the wireless devices 2a-b. The term wireless device is also known as mobile communication terminal, user equipment (UE), station (STA), mobile terminal, user terminal, user agent, machine-to-machine devices etc., and can be, for example, what today are commonly known as a mobile phone or a tablet/laptop with wireless connectivity or fixed mounted terminal.

In radio communication systems, the data is transmitted and received over the air at a specific radio frequency—either the same for transmission and reception or on separate frequencies. This is often called the radio frequency (RF) or the carrier frequency.

There are many different carrier frequencies, depending on regional spectrum allocation and spectrum license rights. To create a common radio implementation supporting this variety of carrier frequencies, a second set of frequencies is used herein, denoted the Intermediate Frequency (IF), which is used for communication on the cables between the IRU 5 and the remote radio head devices 1a-c.

For uplink communication, the remote radio head devices 1a-c downconvert a received (uplink) signal to IF and send it over its cable to the IRU 5. In this embodiment, the received IF signals are combined in a combiner 15 and fed to an interface circuitry 4. The interface circuitry 4 extracts the received IF signal from the interface and forwards it to the RX (reception) back-end 11. The RX back-end 11 downconverts the received signals from IF to an analogue BB (baseband) signal which is further filtered and digitised. The RX back-end 11 sends the combined received signals in digital form to the baseband module 18 for further processing such as demodulation, decoding, etc. as known in the art per se.

Optionally, the remote radio head devices 1a-c are also powered over the respective cables.

For downlink communication, the process works in reverse to the uplink. Hence, the baseband module 18 sends a digital BB signal for transmission to a TX (transmission) back-end 10 of the IRU 5. The TX back-end 10 pulse shapes the digital BB signal to an analogue transmission signal and upconverts the transmission signal to IF. The transmission signal in IF is then inserted onto the interface by the interface circuitry 4, and provided to the combiner 15 which also functions as a splitter, providing the same transmission signal in IF to all connected remote radio head devices 1a-c over the respective cables. The remote radio head devices 1a-c then upconvert the IF signal to RF and transmit the RF signal over the air to the wireless devices 2a-b.

It is to be noted that the processing of uplink and downlink signals in the IRU and the remote radio head devices 1a-c do not need to occur in the digital domain and can be (but do not need to be) performed completely in the analogue domain.

The remote radio head devices 1a-c convert from IF to RF for downlink transmission and from RF to IF for uplink reception. Conversely, the IRU converts from digital BB to IF for downlink transmission and from IF to digital BB for uplink reception.

By using IF over the cables instead of RF, cheaper, low quality galvanic cables can be used, such s CAT5, CAT5e or CAT6 cables. In this way, existing indoor cabling can many times be reused during installation, which significantly saves cost and installation time.

Moreover, there is an optional control link between a processor 12 in the IRU 5 and each remote radio head device 1a-c. This control link can be used e.g. to transfer received signal power measurements, commands to block received signals and/or to set the RF frequency used for downconversion and upconversion in the remote radio head devices 1a-c.

The transmission and reception is under the control of the MAC (Media Access Control) scheduler in the baseband module 18. The MAC scheduler informs what transmissions should be made and informs, via the downlink signaling, the wireless devices when to transmit and on what frequency and power.

It is to be noted that, although FIG. 1A shows the baseband module 18 connected to one IRU 5, each baseband module 18 can be connected to several IRUs. Each IRU may have its own cell or several IRUs may share a single cell.

It is to be noted that while the embodiment of FIG. 1A shows three remote radio head devices 1a-c, there may be fewer or more remote radio head devices connected to each IRU 5.

The embodiment shown in FIG. 1B is similar to the embodiment of FIG. 1A, and only differences to the embodiment of FIG. 1A will be described. In this embodiment, there are several instances of interface circuitry 4a-c, one for each remote radio head device. Transmission signals are sent in IF from the transmission back-end 10 to each one of the instances of interface circuitry 4a-c, either directly or via a splitter (not shown). Analogously, control signals are sent between the processor 12 and each one of the interface circuitry 4a-c, either directly or via a splitter (not shown). Received signals are sent in IF from the respective interface circuitry 4a-c to a combiner 15 which may here be a pure combiner without splitting functionality.

In this embodiment, the control link between the IRU and the remote radio head devices 1a-c can be point-to-point, which prevents collision of control messages to different remote radio head devices 1a-c. Also, this allows some measurements to be done on each individual link in the IRU 5, e.g. received power measurements. Hence, the IRU may comprise power detectors (see 37a-c of FIGS. 5-6), such as an envelop detector, for detecting uplink power for each remote radio head device.

Furthermore, in this embodiment, different intermediate frequencies may be used on the different interfaces to best adapt to each interface interference and transmission characteristics. Thus, the TX back-end 10 may send the transmission signal using different IF frequencies to the different instances of interface circuitry 4*a-c*, and the RX back-end 11 downconverts from different IF frequencies for the different instances of interface circuitry 4*a-c*.

FIG. 1C is a schematic diagram illustrating an alternative embodiment in terms of IRU and radio base station. Here, the IRU 5 is separate, but connected to, the radio base station 7. The IRU 5 itself can be implemented e.g. as shown in FIG. 1A or FIG. 1B.

Figure 2:
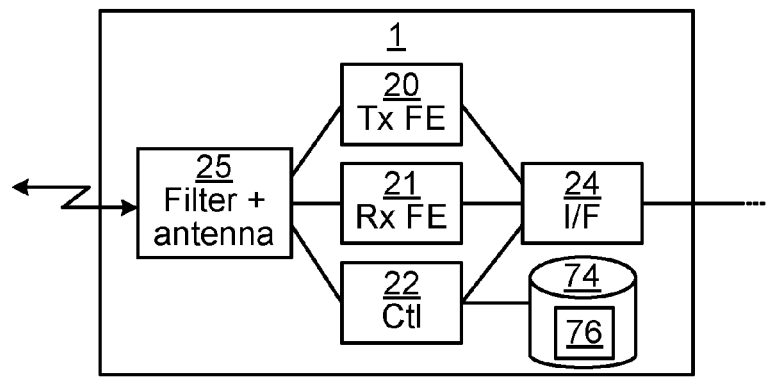
FIG. 2 is a schematic diagram illustrating components of an embodiment of a remote radio head device of FIGS. 1A-C.

FIG. 2 is a schematic diagram illustrating components of an embodiment of a remote radio head device of FIGS. 1A-C, here represented by a single remote radio head device 1. The remote radio head device 1 comprises an interface circuitry 24, a transmission front-end 20, a reception front-end 21, a controller 22 and an antenna device 25. Optionally, the remote radio head device 1 comprises a memory 74 comprising software instructions 76.

In line with what is explained above, the RX Front End 21 downconverts received signals in RF to IF for transfer over the cable to the IRU 5. Moreover, the TX Front End 20 upconverts transmission signals from IF, as received over the cable from the IRU 5 to RF for transmission to wireless devices. The antenna device 25 comprises one or more antennas for transmission of RF signals and reception of RF signals. The antenna device 25 may also comprise appropriate filters to filter out unwanted signals. The interface circuitry 24 inserts and extracts (multiplexes and demultiplexes) the transmission IF signal, the received IF signal and the control signal onto the cable. The interface circuitry 24 may use different frequency bands for uplink signals, downlink signals and control signals to thereby multiplex all of these on a single cable.

A controller 22 communicates with the processor 12 of the IRU. For example, the controller 22 may be used to send the received power measurements to the IRU or to receive commands from the processor 12 to alter frequencies used by the TX Front End 20 and RX Front End 21 for upconversion and/or downconversion. In one embodiment, the controller 22 is in the form of a processor provided using any combination of one or more of a suitable central processing unit (CPU), multiprocessor, microcontroller, digital signal processor (DSP), application specific integrated circuit etc., capable of executing software instructions 76 stored in a memory 74, which can thus be a computer program product. The memory 74 can be any combination of read and write memory (RAM) and read only memory (ROM). The memory 74 also comprises persistent storage, which, for example, can be any single one or combination of magnetic memory, optical memory, solid state memory or even remotely mounted memory.

Figure 3:
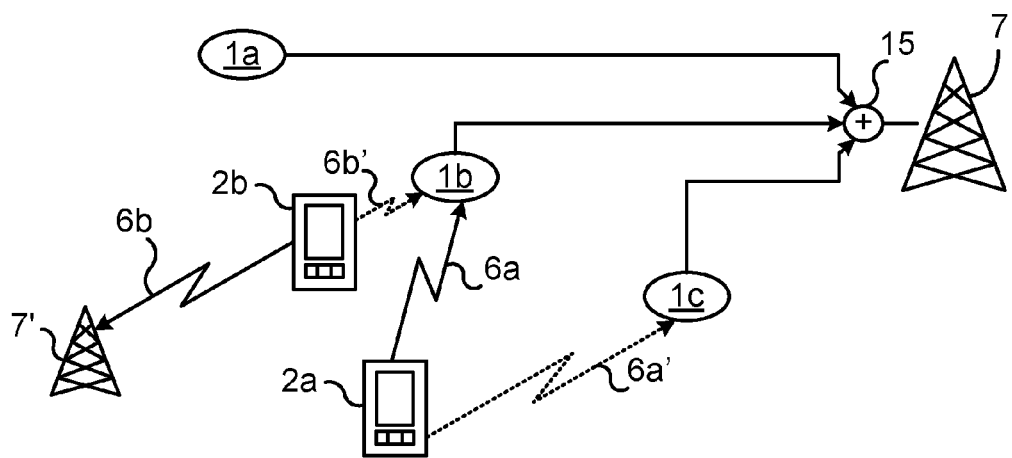
FIG. 3 is a schematic diagram illustrating a scenario where interference occurs in the environment of any one of FIGS. 1A-C.

FIG. 3 is a schematic diagram illustrating a scenario where interference occurs in the environment of any one of FIGS. 1A-C.

There are here a first remote radio head device 1*a*, a second remote radio head device 1*b* and a third remote radio head device 1*c*. As explained above, the receive signals from the three remote radio head devices 1*a-c* are combined in the combiner 15 for further processing by a first radio base station 7.

In this example, a first wireless device 2*a* is connected to the first radio base station 7. An uplink signal 6*a* from the first wireless device 2*a* is received by the second remote radio head device 1*b*. But another propagation of the uplink signal 6*a*' is also received by the third remote radio head device 1*c*, although with slightly more fading. In a normal case where there is no strong interferer, the uplink signal 6*a* and the other propagation of the uplink signal 6*a*' are both fed to the combiner 15 for further processing by the first radio base station 7.

A second wireless device 2*b* is connected to a second radio base station 7' external to the remote radio head devices 1*a-c*. For instance, the second radio base station 7' may belong to a different operator than the first radio base station 7. The second wireless device 2*b* then transmits an uplink signal 6*b* to the second radio base station 7'. However, this uplink signal also acts as interference 6*b*' to the nearby second remote radio head device 1*b*. In a situation where the second wireless device is very close to the second remote radio head device 1*b*, the interference 6*b*' can completely overshadow the uplink signal 6*a* from the first wireless device 2*a*. Moreover, the interference 6*b*' can be so strong that one or more analogue components (such as an amplifier) of the second remote radio head device 1*b* saturates and overshadows also the other propagation 6*a*' when the received signals from the remote radio head devices 1*a-c* are combined in the combiner 15.

According to embodiments presented herein, this problem is solved by blocking the receive signal from a remote radio head device when a received radio signal has greater power than a threshold.

Looking to the example of FIG. 3 again, receive signals received by the second remote radio head device 1*b* are blocked, effectively preventing the interference 6*b*' from reaching the combiner 15. The other propagation 6*a*' of the uplink signal from the first wireless device 2*a* still reaches the combiner 15 via the third remote radio head device, which reduces the effect for the first wireless device 2*a* of the blocked received signal. As explained in more detail below, the receive signal received in the remote radio head device can be blocked either in the remote radio head device in question or in the IRU, as long as the blocking occurs prior to the received radio signal reaching the combiner.

Figure 4A:
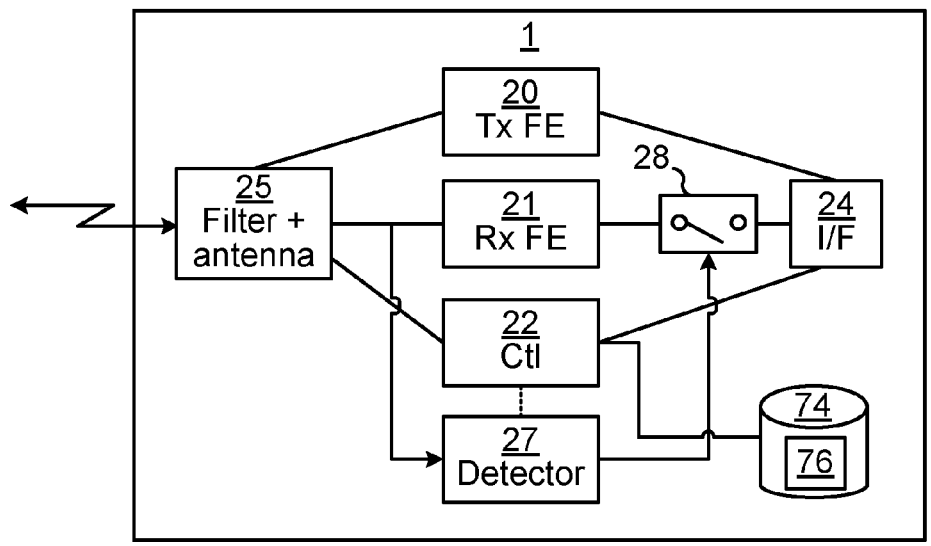
FIGS. 4A-B are schematic diagraphs illustrating alternative embodiments of the remote radio head device of FIGS. 1A-C.
Figure 4B:
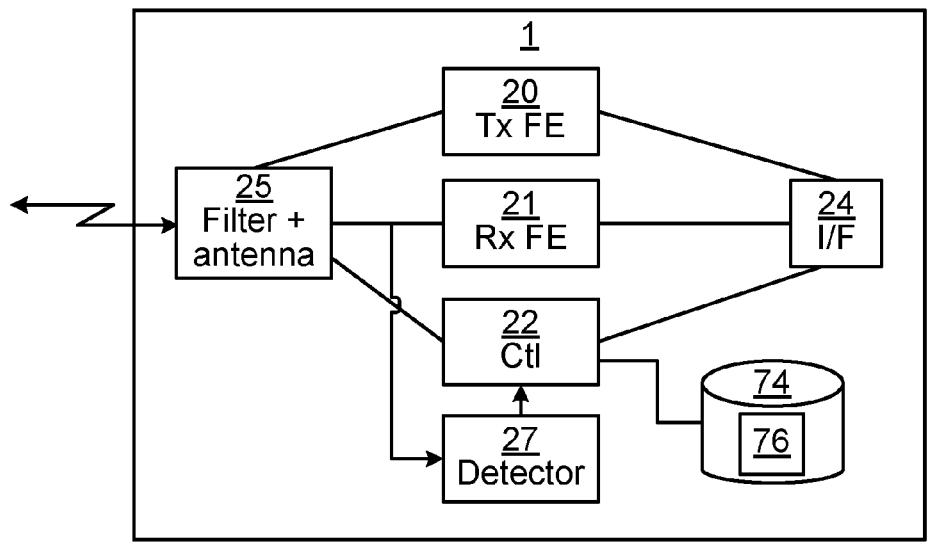

FIGS. 4A-B are schematic diagraphs illustrating alternative embodiments of the remote radio head device of FIGS. 1A-C. The components shown can be implemented using software instructions such as a computer program executing in the remote radio head device 1 and/or using hardware, such as mentioned hardware or application specific integrated circuits, field programmable gate arrays, discrete logical components, etc. The components correspond to the steps in the methods illustrated in FIG. 8 below.

Looking first to FIG. 4A, there is a detector 27 which can measure the power level of a received radio signal. For example, the detector 27 can be an envelope detector. Here the detector 27 is shown as connected to detect a signal between the filter & antenna 25 and the RX front end 21. However, the detector 27 can be arranged to detect a signal in any suitable position, as long as the detector detects a power level of a signal received by the remote radio head device 1.

In this embodiment, the remote radio head device 1 also comprises a blocking device 28 arranged to controllably block the received radio signals, thereby preventing the received radio signals from being sent uplink to the combiner.

The blocking device can be any suitable device capable of blocking a signal based on a control signal. For instance, the blocking device 28 can be a switch. The blocking device 28 is here shown provided between the RX front end 21 and the interface circuitry 24, but the blocking device could also be provided between the filter+antenna 25 and the RX front end 21 or anywhere else where the blocking device can block a received signal from reaching an uplink combiner.

When the received radio signal exceeds a threshold power, the detector 27 controls the blocking device 28 to go to a blocking state. Optionally, the detector 27 sends a power measurement signal to the controller 22 which in turn executes software instructions 76 from the memory 74 to compare the power measurement signal with a threshold power. The controller then sends a signal to the blocking device 28 when the power measurement signal exceeds the threshold power to block uplink transmission of received signals.

In one embodiment, the detector 27 sends the power measurement signal to another node, such as the IRU. The other node then makes a decision whether to block or not. When the other node determines that received signals of the remote radio head device are to be blocked, the other node sends a blocking signal back to the remote radio head device 1. The controller 22 then receives the blocking signal and controls the blocking device 28 to enter a blocking state, to thereby block received signals to reach the IRU and also the radio base station. Optionally, the remote radio head device 1 does not comprise the detector 27, but is still able to receive blocking signals to block received signals, corresponding to the embodiment shown in FIG. 6 and described below.

Figure 8A:
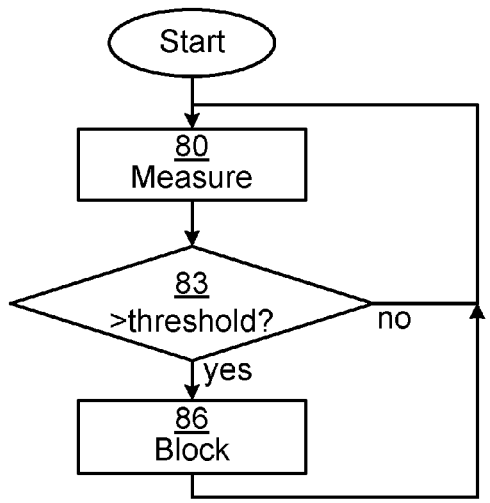
FIGS. 8A-B are flow charts illustrating methods performed in a remote radio head device of FIGS. 1A-C for selectively receiving radio signals from one or more wireless devices.
Figure 8B:
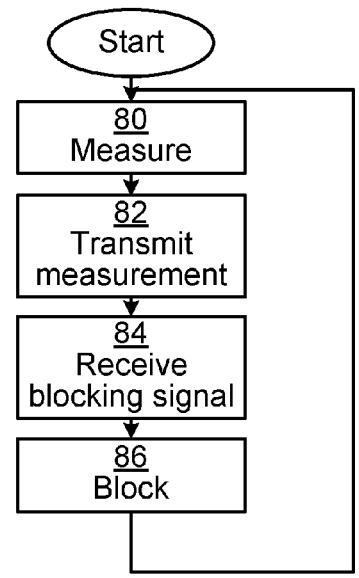

The detector 27 corresponds to the measure step 80 of FIGS. 8A-B. The controller 22 and the interface circuitry can be used to implement the transmit measurement step 82 and the receive blocking signal step 84 of FIG. 8B. The controller 22 and the blocking device 28 can be used to implement the block step 86 of FIGS. 8A-B.

In the embodiment shown in FIG. 4B, the detector 27 sends the power measurement signal to the controller 22. The controller 22 executes software instructions 76 of the memory 74 to send the power measurement signal uplink to the IRU via the control link. The IRU can then evaluate the power measurements and block the received radio signals from the remote radio head device when the power level exceeds the threshold power.

Figure 5:
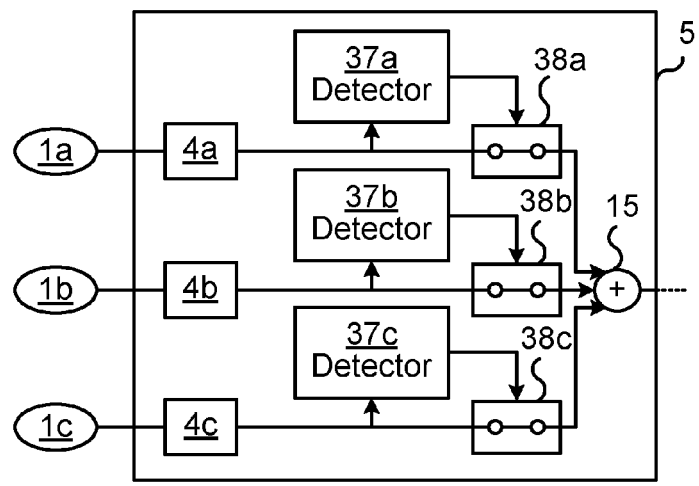
FIG. 5 is a schematic diagram illustrating an alternative embodiment of the IRU of FIGS. 1A-C used with remote radio head devices.

FIG. 5 is a schematic diagram illustrating an alternative embodiment of the IRU of FIGS. 1A-C used with remote radio head devices. The components shown can be implemented using software instructions such as a computer program executing in the IRU 5 and/or using hardware, such as mentioned hardware or application specific integrated circuits, field programmable gate arrays, discrete logical components, etc. The components correspond to the steps in the methods illustrated in FIGS. 7A-B below.

For reasons of clarity, only the UL receive path is shown here and other parts are omitted (such as for DL transmission). In this embodiment, the IRU 5 is connected to three respective remote radio head devices 1a-c. Looking first at the first remote radio head device 1a, a received signal is fed in IF to the first interface circuitry 4a which separates the received signal part. A first detector 37a detects the power level of the received signal and is in turn connected to a first blocking device 38a such as a switch. The received signal is passed from the first interface circuitry 4a via the first blocking device 38a to the combiner 15.

Analogously for the second remote radio head device 1b, a received signal is fed in IF to the second interface circuitry 4b which separates the received signal part. A second detector 37b detects the power level of the received signal and is in turn connected to a second blocking device 38b such as a switch. The received signal passed from the second interface circuitry 4b via the first blocking device 38b to the combiner 15.

Also, for the third remote radio head device 1c, a received signal is fed in IF to the third interface circuitry 4c which separates the received signal part. A third detector 37c detects the power level of the received signal and is in turn connected to a third blocking device 38c such as a switch. The received signal passed from the third interface circuitry 4c via the first blocking device 38c to the combiner 15.

In this way, when one of the detectors 37a-c detects that a received signal exceeds a threshold power, the detector in question sends a signal to the corresponding blocking device, to thereby blocking the received signal from reaching the combiner 15.

Figures 7A, 7B:
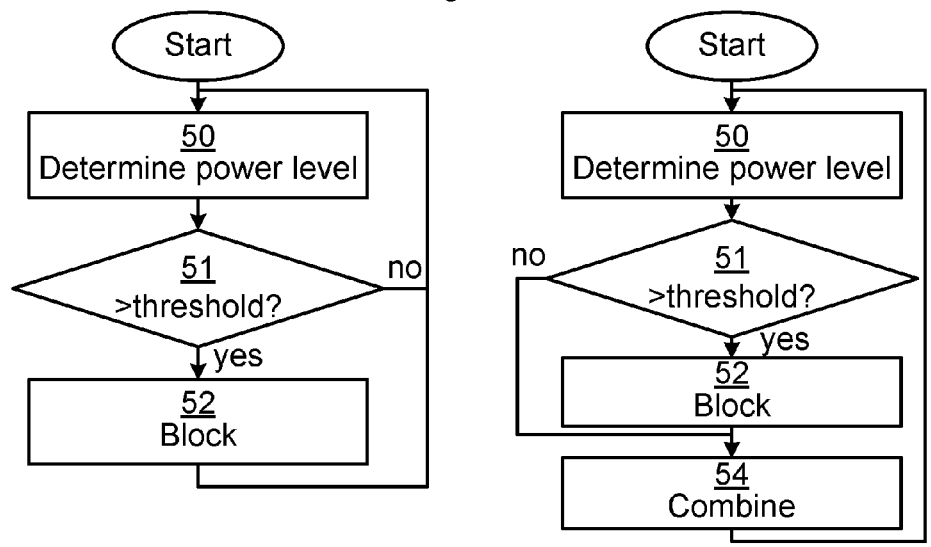
FIGS. 7A-B are flow charts illustrating methods performed in a network node of FIGS. 1A-C for selectively receiving radio signals.

The detectors 37a-c can be used to implement the determine power level step of FIGS. 7A-B and the blocking devices 38a-c can be used to implement the block step of FIGS. 7A-B. Furthermore, the combiner 15 can be used to implement the combine step 54 of FIG. 7B.

Figure 6:
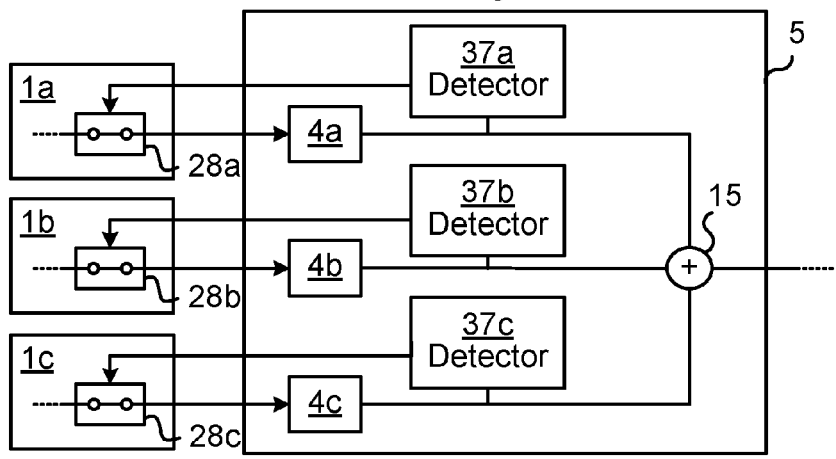
FIG. 6 is a schematic diagram illustrating an alternative embodiment of the IRU of FIGS. 1A-C used with remote radio head devices in accordance with FIG. 4A.

FIG. 6 is a schematic diagram illustrating an alternative embodiment of the IRU of FIGS. 1A-C used with remote radio head devices 1a-c in accordance with FIG. 4A. In this embodiment, each one of the remote radio head devices 1a-c comprises a respective switch 28a-c.

The detectors 37a-c are located in the IRU 5. When one of the detectors 37a-c detects that a received signal exceeds a threshold power, the detector in question sends a signal to the blocking device in the corresponding remote radio head device, to thereby block the received signal from reaching the combiner 15. The signal from the respective detector 37a-c to the respective blocking device 28a-c can e.g. be transferred on the control link as described above.

FIGS. 7A-B are flow charts illustrating methods performed in a network node of FIGS. 1A-C for selectively receiving radio signals received in a plurality of remote radio head devices connected to the network node. The network node can be the IRU 5 or the radio base station 7 of FIGS. 1A-C. In any case, the network node is connected to a plurality of remote radio head devices as described above.

In a determine power level step 50, a power level, e.g. RSSI (Received Signal Strength Indicator) of a received radio signal for a first remote radio head device is determined. The power level can e.g. be determined using an envelope detector.

In a conditional >threshold step 51, it is checked whether the power level exceeds a threshold power. If this is the case, the method proceeds to a block step 52. Otherwise, the method returns to the determine power level step 50, optionally via a delay (not shown).

In the block step 52, received radio signals from the first remote radio head device are blocked. This may comprise sending a command to the first remote radio head device to block its received radio signal output, e.g. over the control link as described above. In such a case the actual blocking is performed by the remote radio head device in question, as controlled by the network node. This corresponds to the scenario illustrated in FIG. 6 and described above.

Alternatively, the blocking of the received radio signal from the first remote radio head device is performed within the network node. This corresponds to the scenario illustrated in FIG. 5 and described above.

The method can be performed in parallel for each one of the remote radio head devices connected to the network node.

Once the power level of the received radio signal falls below the threshold power, the blocking device can be set in a conducting state again.

FIG. 7B is a flow chart illustrating a method similar to the method illustrated in FIG. 7A. Only new steps or steps which are modified compared to the method illustrated in FIG. 7A will be described below.

In a combine step 54, received radio signals from all remote radio head devices except the first remote radio head device are combined to a common received signal. This is an effect of blocking received radio signal from the first remote radio head and combining. Optionally, this comprises combining the radio signals as intermediate frequency.

FIGS. 8A-B are flow charts illustrating methods performed in a remote radio head device of FIGS. 1A-C for selectively receiving radio signals from one or more wireless devices.

The method of FIG. 8A will be explained first.

In a measure step 80, a power level of a received radio signal is measured, yielding a power measurement. This can e.g. be performed using an envelope detector.

In a conditional >threshold step 83, it is checked whether the power level exceeds a threshold power. If this is the case, the method proceeds to a block step 86. Otherwise, the method returns to the measure step 50, optionally via a delay (not shown).

In a block step 86, received radio signals are blocked.

Looking now to FIG. 8B, an embodiment of a method is shown where the decision to block is made in the network node.

In a transmit measurement step 82, the power measurement is transmitted to the network node, e.g. over the control link as described above.

In a receive blocking signal step 84, a blocking signal is received from the network node, e.g. over the control link as described above.

In the block step 86, received radio signals are blocked in accordance with the blocking signal.

Figure 9:
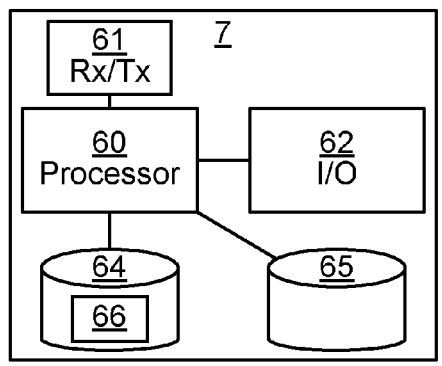
FIG. 9 is a schematic diagram showing some components of an embodiment of the radio base station of FIGS. 1A-C.

FIG. 9 is a schematic diagram showing some components of the radio base station 7 of FIGS. 1A-C. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product. The processor 60 can be configured to execute the methods described with reference to FIGS. 7A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 65 can be any combination of read and write memory (RAM) and read only memory (ROM). The data memory 65 may also comprise persistent storage, which, for example, can be any single one or combination of magnetic memory, optical memory, solid state memory or even remotely mounted memory.

The radio base station 7 further comprises an I/O interface 62 for communicating with a core network and optionally with other radio base stations.

The radio base station 7 also comprises one or more transceivers 61, comprising analogue and digital components for radio communication with wireless devices within one or more radio cells, e.g. using remote radio head devices as described above. The processor 60 controls the general operation of the radio base station 7, e.g. by sending control signals to the transceiver 61 and receiving reports from the transceiver 61 of its operation.

Other components of the radio base station 7 are omitted in order not to obscure the concepts presented herein.

Figure 10:
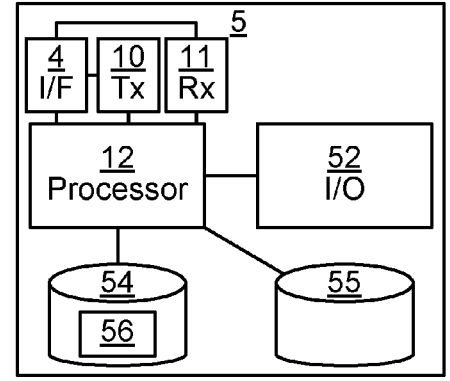
FIG. 10 is a schematic diagram showing some components of an embodiment of any one of the intermediate radio units of FIGS. 1A-C.

FIG. 10 is a schematic diagram showing some components of an embodiment of any one of the intermediate radio units 5 of FIGS. 1A-C, here represented by a single intermediate radio unit 5. A processor 12 is provided using any combination of one or more of a suitable central processing unit (CPU), multiprocessor, microcontroller, digital signal processor (DSP), application specific integrated circuit etc., capable of executing software instructions 56 stored in a memory 54, which can thus be a computer program product. The processor 12 can be configured to execute the methods described with reference to FIGS. 7A-B above.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

A data memory 55 can be any combination of read and write memory (RAM) and read only memory (ROM). The data memory 55 may also comprise persistent storage, which, for example, can be any single one or combination of magnetic memory, optical memory, solid state memory or even remotely mounted memory.

The intermediate radio unit 5 further comprises an interface circuitry 4, a transmitter back-end 10 and receiver back-end 11 which operate as described with reference to FIGS. 1A-C above.

The intermediate radio unit 5 may be separate from and connected to a radio base station, or form part of a hosting radio base station. When the intermediate radio unit 5 forms part of a hosting radio base station, some or all of the components of FIG. 7 may also be used for other purposes within the radio base station and may e.g. be the equivalent components shown in FIG. 8.

Other components of the intermediate radio unit 5 are omitted in order not to obscure the concepts presented herein.

Figure 11:
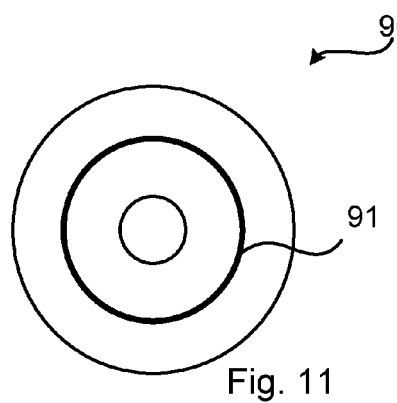
FIG. 11 shows one example of a computer program product comprising computer readable means.

FIG. 11 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 74 of FIG. 2 or FIGS. 4A-B, the computer program product 66 of FIG. 9 or the computer program product 56 of FIG. 10. While the computer program 91 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method, performed in a network node, for selectively receiving radio signals from a plurality of wireless devices and received in a plurality of remote radio head devices connected to the network node, wherein first radio signals from a particular wireless device of the plurality of wireless devices recieved at more than one remote radio head device are combined, the method comprising:
   determining that a power level of a received radio signal at a first remote radio head device exceeds a threshold power, where exceeding the threshold power at the first remote radio head device by a second radio signal from another wireless device causes the second radio signal to saturate the first remote radio head device and interfere with the first radio signals when the first radio signals from more than one remote radio head device are combined; and
   blocking all received radio signals from the first remote radio head device when the power level exceeds the threshold power for the received radio signal at the first remote radio head device.

2. The method according to claim 1, wherein the determining comprises detecting the power level using an envelope detector.

3. The method according to claim 2, wherein the blocking comprises sending a command to the first remote radio head device to block its received radio signal output.

4. The method according to claim 2, wherein the blocking comprises blocking, within the network node, all received radio signals from the first remote radio head device.

5. The method according to claim 1, further comprising combining the first radio signals from the plurality of remote radio head devices except the first remote radio head device.

6. The method according to claim 5, wherein the combining comprises combining the first radio signals at an intermediate frequency.

7. The method according to claim 1, wherein the determining is performed in parallel for each one of the plurality of remote radio head devices and the blocking is performed for respective remote radio head devices exceeding the threshold power.

8. A network node for selectively receiving radio signals from a plurality of remote radio head devices connected to the network node, wherein the plurality of remote radio head devices receive radio signals from a plurality of wireless devices, wherein first radio signals from a particular wireless device of the plurality of wireless devices received at more than one remote radio head device are combined, the network node comprising:
   a power level detector arranged to determine that a power level of a received radio signal at a first remote radio head device exceeds a threshold power, where exceeding the threshold power at the first remote radio head device by a second radio signal from another wireless device causes the second radio signal to saturate the first remote radio head device and interfere with the first radio signals when the first radio signals from more than one remote radio head device are combined; and
   a blocking device arranged to block all received radio signals from the first remote radio head device when the power level exceeds the threshold power for the received radio signal at the first remote radio head device.

9. The network node according to claim 8, wherein the power level detector comprises an envelope detector.

10. The network node according to claim 8, wherein the blocking device is a switch.

11. The network node according to claim 8, further comprising a combiner for combining the first radio signals from the plurality of remote radio head devices except the first remote radio head device when all received radio signals from the first remote radio head device is blocked.

12. The network node according to claim 11, wherein the combiner comprises an intermediate frequency combiner.

13. The network node according to claim 8, further comprising a respective power level detector and blocking device for each of the plurality of the remote radio head devices.

14. A non-transitory computer readable storage medium containing program code which, when executed by a processor in a network node, causes the network node to perform operations for selectively receiving radio signals from a plurality of wireless devices and received in a plurality of remote radio head devices connected to the network node, wherein first radio signals from a particular wireless device of the plurality of wireless devices recieved at more than one remote radio head device are combined, the operations comprising:
   determining that a power level of a received radio signal at a first remote radio head device exceeds a threshold power, where exceeding the threshold power at the first remote radio head device by a second radio signal from another wireless device causes the second radio signal to saturate the first remote radio head device and interfere with the first radio signals when the first radio signals from more than one remote radio head device are combined; and
   combining radio signals from the plurality of the remote radio head devices, except all received radio signals from the first remote radio head device, yielding a combined received radio signal.

15. A method for selectively receiving radio signals from a plurality of wireless devices, the method being performed in a remote radio head device of a plurality of radio head devices connected to a network node, wherein first radio signals from a particular wireless device of the plurality of wireless devices recieved at the plurality of remote radio head devices are combined at the network node, comprising:
   measuring a power level of a received radio signal received at the remote radio head device, yielding a power measurement, where exceeding a threshold power at the remote radio head device by a second radio signal from another wireless device causes the second radio signal to saturate the remote radio head device and interfere with the first radio signals when the first radio signals from the plurality of remote radio head devices are combined at the network node; and
   blocking all received radio signals received at the remote radio head device in dependence of the power level to thereby prevent the received radio signal to reach the network node.

16. The method according to claim 15,
   wherein the blocking comprises only blocking all of the received radio signals received at the remote radio head device, when the power level exceeds the threshold power.

17. The method according to claim 15, further comprising:
   transmitting the power measurement to the network node; and
   receiving a blocking signal from the network node.

18. A remote radio head device for selectively receiving radio signals from a plurality of wireless devices, the remote radio head device being one of a plurality of remote radio head devices connected to a network node, wherein first radio signals from a particular wireless device of the plurality of wireless devices recieved at the plurality of remote radio head devices are combined at the network node, the remote radio head device comprising:

- a power detector arranged to measure a power level of a received radio signal received at the remote radio head device, yielding a power measurement, where exceeding a threshold power at the remote radio head device by a second radio signal from another wireless device causes the second radio signal to saturate the remote radio head device and interfere with the first radio signals when the first radio signals from the plurality of remote radio head devices are combined at the network node; and
- a blocking device arranged to block all received radio signals received at the remote radio head device to thereby prevent the received radio signal to reach the network node.

19. The remote radio head device according to claim 18, wherein the blocking device is arranged to only block all of the received radio signals received at the remote radio head device, when the power level exceeds the threshold power.

20. The remote radio head device according to claim 18, further comprising:

- a transmitter arranged to transmit the power measurement to the network node; and
- a controller arranged to receive a blocking signal from the network node to thereby prevent all of the received radio signals from the remote radio head device to reach the network node.

21. A non-transitory computer readable storage medium containing program code which, when executed by a processor in a remote radio head device, causes the remote radio head device to perform operations for selectively receiving radio signals from a plurality of wireless devices, in which the remote radio head device being one of a plurality of remote radio head devices connected to a network node, wherein first radio signals from a particular wireless device of the plurality of wireless devices recieved at the plurality of remote radio head devices are combined at the network node, the operations comprising:

- measuring a power level of a received radio signal received at the remote radio head device, yielding a power measurement, where exceeding a threshold power at the remote radio head device by a second radio signal from another wireless device causes the second radio signal to saturate the remote radio head device and interfere with the first radio signals when the first radio signals from the plurality of remote radio head devices are combined at the network nodes;
- transmitting the power measurement to the network node;
- receiving a blocking signal from the network node; and
- blocking all received radio signals received at the remote radio head device to prevent the received radio signal from reaching the network node.

* * * * *

UNITED STATES PATENT AND TRADEMARK OFFICE
CERTIFICATE OF CORRECTION

| | |
|---|---|
| PATENT NO. | : 9,825,720 B2 |
| APPLICATION NO. | : 15/108560 |
| DATED | : November 21, 2017 |
| INVENTOR(S) | : Österling |

It is certified that error appears in the above-identified patent and that said Letters Patent is hereby corrected as shown below:

In the Specification

In Column 2, Line 59, delete "threshold power" and insert -- threshold power. --, therefor.

In Column 3, Line 40, delete "a eighth" and insert -- an eighth --, therefor.

In Column 4, Line 40, delete "diagraphs" and insert -- diagrams --, therefor.

In Column 5, Line 11, delete "Multiplex)," and insert -- Multiple Access), --, therefor.

In Column 6, Line 21, delete "such s" and insert -- such as --, therefor.

In Column 8, Line 40, delete "diagraphs" and insert -- diagrams --, therefor.

In Column 10, Line 2, delete "first blocking device 38b" and insert -- second blocking device 38b --, therefor.

In Column 10, Line 10, delete "first blocking device 38c" and insert -- third blocking device 38c --, therefor.

In the Claims

In Column 13, Line 7, in Claim 1, delete "recieved" and insert -- received --, therefor.

In Column 14, Line 19, in Claim 14, delete "recieved" and insert -- received --, therefor.

In Column 14, Line 40, in Claim 15, delete "recieved" and insert -- received --, therefor.

In Column 15, Line 3, in Claim 18, delete "recieved" and insert -- received --, therefor.

Signed and Sealed this
Twenty-second Day of January, 2019

Andrei Iancu
*Director of the United States Patent and Trademark Office*

CERTIFICATE OF CORRECTION (continued)
U.S. Pat. No. 9,825,720 B2

In Column 16, Line 12, in Claim 21, delete "recieved" and insert -- received --, therefor.

In Column 16, Line 23, in Claim 21, delete "nodes;" and insert -- node; --, therefor.